United States Patent [19]

Rialan

[11] Patent Number: 4,908,803
[45] Date of Patent: Mar. 13, 1990

[54] SEMI-SEQUENTIAL TRANSMISSION METHOD AND SYSTEM USING SIMULTANEOUSLY SEVERAL RADIO TRANSMISSION FREQUENCIES FOR CONNECTING A SEISMIC RECEPTION ASSEMBLY TO A CENTRAL CONTROL AND RECORDING LABORATORY

[75] Inventor: Joseph Rialan, Meudon, France

[73] Assignee: Institut Francais du Petrole, Rueil Malmaison, France

[21] Appl. No.: 313,035

[22] Filed: Feb. 21, 1989

[30] Foreign Application Priority Data

Feb. 19, 1988 [FR]  France .............................. 88 02104

[51] Int. Cl.$^4$ .............................................. G01V 1/22
[52] U.S. Cl. ......................................... 367/77; 455/56
[58] Field of Search ................. 367/6, 77, 80; 455/75, 455/76, 56, 57; 342/51

[56] References Cited

U.S. PATENT DOCUMENTS 4,042,906  8/1977  Ezell ..................................... 367/77

Primary Examiner—Thomas H. Tarcza
Assistant Examiner—Ian J. Lobo
Attorney, Agent, or Firm—Antonelli, Terry & Wands

[57] ABSTRACT

A semi-sequential transmission method and system are provided making it possible for successive groups of seismic acquisition apparatus to communicate simultaneously, using several transmission frequencies, with a central seismic laboratory. Each of said apparatus comprises a frequency synthesizer capable, by means of switches, of setting itself to any one of different frequencies, and means for automatic distribution of the frequencies between the apparatus of the same group. Each of the apparatus, being given an order number dependent on its position along a seismic profile to be studied, determines the difference between its own order number and an order number which it receives by radio and which is that assigned to the first acquisition apparatus of its group. Depending on the difference measured and respecting certain limitations, each acquisition apparatus attributes to itself its own transmission frequency.

9 Claims, 1 Drawing Sheet

SEMI-SEQUENTIAL TRANSMISSION METHOD AND SYSTEM USING SIMULTANEOUSLY SEVERAL RADIO TRANSMISSION FREQUENCIES FOR CONNECTING A SEISMIC RECEPTION ASSEMBLY TO A CENTRAL CONTROL AND RECORDING LABORATORY

BACKGROUND OF THE INVENTION

The invention relates to a semi-sequential transmission system for transmitting, by short wave link, signals between data acquisition apparatus of a seismic reception assembly and a central control and recording laboratory by means of several transmission frequencies and with automatic distribution of the different available frequencies between the acquisition apparatus.

1. Field of the Invention

Modern seismic prospection methods comprise the use of data acquisition apparatus spread out at even intervals over a distance sometimes of several kilometers. They are each adapted for collecting seismic signals picked up by one or more appropriate receivers (hydrophones or geophones) in response to shocks transmitted into the ground by a seismic source and reflected by the discontinuities of the subsoil. The signals which they collect are sampled, digitized and stored in a memory before being transmitted in real or deferred time to a central control and recording laboratory.

2. Description of the Prior Art

Different radio transmission systems making it possible to centralize seismic data collected by acquisition apparatus are described in the French patent application FR No. 2 599 533, in the French patents FR Nos. 2 511 772 and 2 197 182, in the British patent GB No. 2 055 467 or the U.S. Pat. Nos. 4,152,691, 4,086,504, 3,987,406, for example.

Transmission of the data collected by the acquisition devices may also take place sequentially, each of them transmitting its own data in turn either directly to the central laboratory or through other intermediate acquisition devices or relay elements. Recording means are used for storing the data collected, during the time necessary for its sequential transfer to the central laboratory.

These methods only require a wide band short wave channel. But if the number of acquisition apparatus successively interrogated is large, the total transfer time and so the time interval between two successive seismic transmission-reception cycles become great, which contributes to lengthening the time for exploring the seismic profile studied.

Transmission to the central laboratory of the collected data may take place in real time and simultaneously for all the acquisition apparatus. That requires the use and so the availability of a large number of wide band or narrow band short wave transmission channels, of different frequencies. The use of such a system is often difficult in practice. Each of the apparatus must be equipped with a radio transmitter-receiver individualized by a particular transmission frequency and the central laboratory with selective detection assemblies for separating the signals modulating the different carriers. The preparatory adjustment and setting up work is made longer and more complex. Furthermore, the simultaneous transmission of data is often disturbed by cross modulation phenomena occurring on reception at the central laboratory between carriers of very different levels which emanate from near-by transmitters and more distant transmitters.

The use of a combined transmission system in which a limited number of acquisition apparatus simultaneously transfer to the central laboratory the data which they have collected by means of a certain number of different carrier frequencies may form an interesting alternative to the extent that the total time for centralizing the data may thus be reduced. But the setting up of such a system is delicate. The different acquisition apparatus after installation in the field must be individualized. Each of them is then adjusted so as to transmit or receive on one frequency from the available frequencies. Since the acquisition apparatus are not necessarily disposed in the field by respecting the increasing order of their respective serial numbers, for practical positioning reasons, the operator who adjusts them must record the number of the radio channel associated with each of them. This may be a source of error, particularly when a defective acquisition apparatus must be replaced by another whose serial number is different.

The transmission method and system of the invention avoids the above drawbacks.

SUMMARY OF THE INVENTION

The method of the invention makes possible the semi-sequential transmission of signals, by short wave link, between an assembly of N data acquisition apparatus of a seismic reception device and a central control and recording laboratory by means of a restricted number n of different transmission frequencies ($f_1, f_2 \ldots f_n$) very much less than the number of acquisition apparatus N of said assembly, each of them being adapted to collect signals received by at least one seismic receiver disposed along a seismic profile to be studied, to digitize and record said signals and, controlled by the central laboratory, to transmit thereto by radio the stored signals.

It is remarkable in that it comprises:

assignment to each apparatus of an order number as a function of its position along the seismic profile, subdivision of the assembly of acquisition apparatus into groups each containing at most n acquisition apparatus, transmission by the laboratory of a transmission control signal designating the order number of a first acquisition apparatus of each of the groups successively, comparison, by each of the N acquisition apparatus of the assembly, of the order number designated by the control signal with its own order number and, if said difference is compatible with the number of frequencies available, switching of the transmission means to a transmission frequency corresponding in a predetermined way to said difference, the acquisition apparatus of the same group thus sharing out among themselves all the available transmission frequencies, and transmission of signals between the acquisition apparatus of the same group and the central laboratory, each one using the particular frequency imposed by said comparison.

The transmission system of the invention is remarkable in that all the acquisition apparatus of said assembly and the central laboratory are each provided with radio transmission and reception means which may be switched indifferently to any one of the transmission frequencies (f1, f2 ... fn), each of the acquisition apparatus comprising means for storing an order number depending on its position along the seismic profile, means for determining the difference between the order number which is assigned to it and the number designated by control signals emanating from the central laboratory and switching means for selecting among all the available frequencies (f1 to fn) and, in the limit of the number n, a transmission frequency associated in a predetermined way with said difference.

With such a system, it is no longer necessary to individualize beforehand the different acquisition apparatus by means of a particular carefully noted transmission frequency. The operators may place them one by one in the field in any order, only assigning respectively thereto order numbers corresponding to their real position along the seismic profile. Selection of the particular transmission frequency to which each of the apparatus switches is carried out by each of them as a function of a comparison between a transmission order number coming from the central laboratory by means of a control signal and its own order number, without the least risk of confusion. The preparatory phase for a prospection campaign is therefore greatly simplified.

BRIEF DESCRIPTION OF THE DRAWINGS

Other features and advantages of the transmission method and system of the invention will be clear from the following description of one embodiment given by way of non limitative example, with reference to the accompanying drawings in which.

DESCRIPTION OF THE PREFERRED EMBODIMENT

Figure 1:
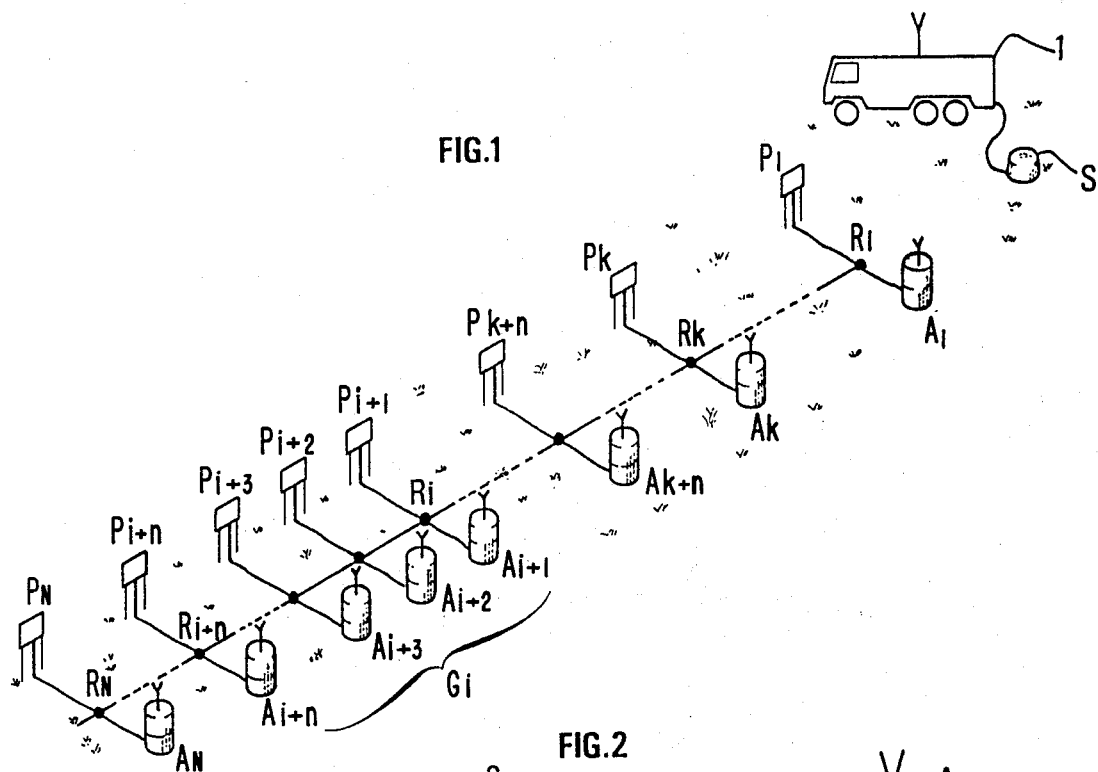
FIG. 1 shows schematically a reception assembly along a seismic profile to be explored.

The system of the invention is adapted for establishing communications between a central control and recording laboratory installed in a vehicle 1 (FIG. 1) and an assembly of N seismic data acquisition apparatus or boxes (A1, A2, ... AN) distributed over the ground where the seismic operations are taking place. Each apparatus is adapted for collecting seismic signals picked up by one or more seismic receivers (R1 ... Ri ... RN) coupled with the ground, these signals corresponding to echoes from underground reflectors of shocks applied to the ground by a seismic source S of any type. The seismic receivers R1 to RN are disposed at previously defined positions and generally referenced by numbered stakes P1 ... Pi ... PN. The acquisition apparatus digitize the signals picked up and record them. At the end of each transmission-reception cycle, the acquisition apparatus controlled sequentially by the central laboratory transmit thereto the data which they have stored. They are disposed preferably in sealed cases associated possibly with buoys, when operating in water covered or very humid zones (lakes, marshes, forests etc.).

A seismic reception device may comprise for example 200 acquisition apparatus associated with sensors spaced apart by 50 meters or so.

Figure 2:
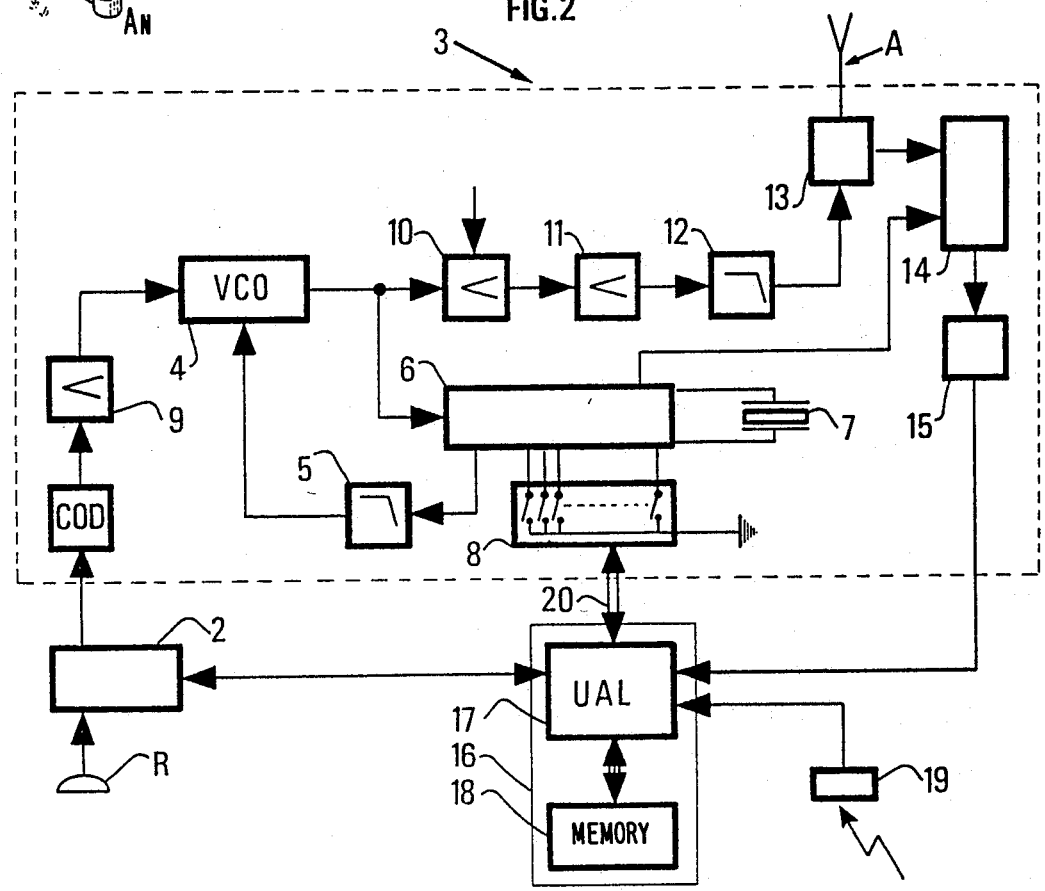
FIG. 2 shows schematically an acquisition apparatus comprising a carrier wave generator with frequency synthesis and selection means.

Each seismic acquisition apparatus comprises (FIG. 2) an acquisition unit 2 adapted for amplifying the signals received from receiver R, sampling them, digitizing them and storing them. In the case where several receivers are connected to the same acquisition apparatus, the acquisition unit 2 further comprises a head multiplexer (not shown) as is well known. The acquisition unit is associated with a transmission-reception assembly 3 adapted for transmitting coded signals to the central laboratory in response to control signals emanating therefrom, using a frequency from a restricted number of carrier frequencies f1, f2 ... fn, as will be seen further on.

The transmission-reception assembly 3 comprises an oscillator 4 of VCO type whose oscillation frequency is determined by the application of a control voltage from a low-pass filter 5. The input of filter 5 is connected to the output of a frequency synthesizer circuit 6 of a known type comprising phase locked loops (PLL) and a pre-divider for applying, to the reference frequency defined by a quartz 7, a programmable reduction factor. The selection of this reduction factor is made by selectively controlling switches of an assembly of switches 8. The signal applied to the input of the synthesizer circuit 6 is the output signal from the (VCO) oscillator 4. The signal delivered by the acquisition unit is applied to a coding element (COD) applying for example the well known code NRZ to the digitized seismic signals. The coded signals are then amplified by an amplification stage 9 and applied to the "modulation" input of oscillator 4. The modulated carrier available at the output of oscillator 4. is applied to an amplification chain comprising a preamplifier 10, a power amplifier 11 and a low-pass filter 12, the amplified signal being applied to a transmission-reception antenna A through an antenna duplexer of known type 13.

To the antenna duplexer 13 is also connected a radio receiver 14 adapted for receiving the control signals from the central laboratory, carried by a signal of well defined frequency. Demodulation of the signals received is carried out by using a signal produced by the frequency synthesizer circuit 6. The demodulated signals from receiver 14 and decoded by an appropriate decoder 15 then applied to a microprocessor processing assembly 16 comprising an arithmetic and logic unit 17 and a memory unit 18. Unit 17 comprises an input port for the connection of an interface element 19 appropriate to the type of connection. An infrared optical receiver may for example be used such as that described in the French patent application EN No. 86 11876 and which makes it possible for an operator to communicate instructions to the acquisition apparatus without having to establish a material connection therewith. The interface element 19 may be further formed, depending on the case, from a short wave receiver or a connection means for a transmission cable. A connection 20 is formed between the arithmetic and logic unit 17 and the switching assembly 8, so that the reduction factor applied by the latter and so the transmission frequency may be modified at will.

The system operates in the following way:

During the preparatory phase to a seismic prospection campaign, the processing assemblies 17 of all the acquisition apparatus are programmed for:

generating n distinct control signals for the switching assembly 8, such that the frequency of the carrier signal generated by the VCO oscillator 4 may take on n predetermined distinct values; and making a frequency selection among these n possibilities taking into account their own order number which is assigned to them.

In a practical embodiment, the number n may be chosen equal to 4 or 8.

During the installation phase in the field when the acquisition apparatus are connected respectively to one or more seismic receivers (Ri), the operator introduces into the storage unit 18 of each of them the order number read from the corresponding marking stake (Pi), by means of the interface element 19. The assembly of N acquisition apparatus is subdivided into groups of n apparatus so that, after the n available transmission frequencies have been allotted, they may simultaneously transmit to the central laboratory the seismic data which they store during successive transmission-reception cycles.

We will consider for example the case of a group Gi comprising n apparatus Ai+1, Ai+2, Ai+3 ... Ai+n, i being a number less than N. When it is the turn of group Gi to transmit the stored seismic data, the central laboratory sends a general transmission order preceded by an address number (i+1) which is that of the first apparatus Ai+1 of group Gi. The address number (i+1) is decoded by all the N acquisition apparatus spread out over the field. By taking this number as bases, the processing assembly 16 contained in all the apparatus each carries out the following selection operation. They each calculate the difference between their own order number written in their memory unit 18 with the address number received and decoded (i+1). If the difference is positive and strictly less than n, and only in this case, they select one of the transmission frequencies as a function of the value of the difference.

Thus, the acquisition apparatus Ai+1 for which the difference is zero, chooses the frequency f1. The next one Ai+2 for which the difference is equal to unity, chooses the frequency f2. The next ones proceed in a similar manner. The last apparatus Ai+n of group Gi chooses the frequency fn. Each acquisition apparatus may then impose on the assembly of switches 8 the adequate signal for controlling locking of the VCO oscillator 4 to the selected frequency.

A common transmission order is sufficient for initiating the simultaneous transmission of seismic data over the n available frequencies by all the apparatus of the same group.

Considering the instructions imposed on the processing assemblies 17, a transmission order concerning an acquisition apparatus Ai+1 causes the apparatus numbered Ai+1, Ai+2 ... Ai+n to react but remains ignored (a) by the apparatus already interrogated, i.e. those for which the difference is negative, and (b) by all the remaining acquisition apparatus not belonging to the interrogated group, because the difference which they calculate is equal to or greater than the number n of available frequencies.

By thus successively interrogating all the acquisition apparatus at the head of each of the groups, i.e. at an interval of value n from each other, all the seismic data collected may be centralized.

It should be noted that the acquisition apparatus which simultaneously transmit signals are close to one another and so are situated at comparable distances from the central laboratory. The risks of cross modulation related to the simultaneous transmission of signals of very different levels are therefore practically eliminated.

In the example described, the programming which allows the different processing assemblies to choose a predetermined number n of transmission frequencies is carried out initially before the beginning of an exploration campaign. This is of course not limitative. The selection instructions may relate for example to an initially indeterminate number of frequencies, the selection of the precise number being imposed by the operator at the time of placing the acquisition apparatus in the field or even possibly by radio from the central laboratory, for initiating a new transmission-reception cycle.

What is claimed is:

1. A method for the semi-sequential transmission of signals, by short wave link, between an assembly of N data acquisition apparatus of a seismic reception device and a central control and recording laboratory, by means of a restricted number n of different transmission frequencies less than the number N of acquisition apparatus of said assembly, each data acquisition apparatus being adapted to collect signals received by at least one seismic receiver disposed along a seismic profile to be studied, to digitize and record said signals and, controlled by the central laboratory, to transmit thereto by radio the digitized signals, further comprising:

assigning to each acquisition apparatus of an order number as a function of the position thereof along the seismic profile, subdividing the assembly of acquisition apparatus into groups each containing at most n acquisition apparatus, transmitting from the laboratory of a transmission control signal designating the order number of first acquisition apparatus of each of the groups successively, comparing in each of the N acquisition apparatus of the assembly, the order number designated by the control signal with its own order number and, if a difference between said designated order number and its own order number is compatible with the number n of frequencies available, switching of the transmission means to a transmission frequency assigned to said difference, the acquisition apparatus of the same group thus sharing out among themselves all the available transmission frequencies, and transmitting signals from the acquisition apparatus of the same group to the central laboratory, each one using the particular frequency imposed by said comparison.

2. The method as claimed in claim 1, wherein the comparison step comprises selecting, from a list of n available transmission frequencies, a frequency associated with said difference provided that said difference is a number less than the number n of available frequencies.

3. The method as claimed in claim 1, wherein the step of subdividing the assembly of N acquisition apparatus into groups comprises selecting a given number n of transmission frequencies by which any acquisition apparatus of the assembly may, upon control, communicate with the central laboratory.

4. The method as claimed in claim 4, wherein the choice and number of frequencies is effected by a command applied directly to each acquisition apparatus.

5. The method as claimed in claim 4, comprising the transmission of a remote control signal for choosing the number and value of the frequencies used.

6. A system for the semi-sequential transmission of signals, by short wave link, between an assembly of data acquisition apparatus of a seismic reception device and a central control and recording laboratory, by means of a restricted number n of different transmission frequencies less than the number N of acquisition apparatus of said assembly, wherein all the acquisition apparatus of said assembly and the central laboratory are each provided with radio transmission and reception means which may be switched indifferently to any one of the transmission frequencies, each of the acquisition apparatus further comprising means for storing an order number depending on its position along the seismic profile, means for determining a difference between the order number which is assigned to it and a number designated by control signals emanating from the central laboratory and switching means for selecting among all the available frequencies and a transmission frequency, assigned to said difference.

7. The transmission system as claimed in claim 6, comprising a processing assembly provided with a computing unit, a storage unit and an interface element for application by the operator of the order number depending on the position of each acquisition apparatus along the profile.

8. The transmission system as claimed in claim 6, wherein said radio transmission and reception means associated with each acquisition apparatus comprises an oscillator controlled by an electric voltage and a looped circuit comprising a predivider frequency synthesizer applying, to a reference frequency, a division factor dependent on said switching means, a reception unit connected to a processing unit adapted for determining said difference between the order number which is assigned to it and the order number received by the corresponding reception unit, and activating the switching means, the processing unit comprising an interface element for short distance transmission means.

9. The transmission system as claimed in claim 6, wherein said oscillator comprises a modulation input for a signal delivered by a chain comprising a seismic signal acquisition assembly, a coding element and amplification means.

* * * * *